Nov. 28, 1933. J. A. SHAW 1,936,862
TREATMENT OF GAS
Filed March 28, 1931
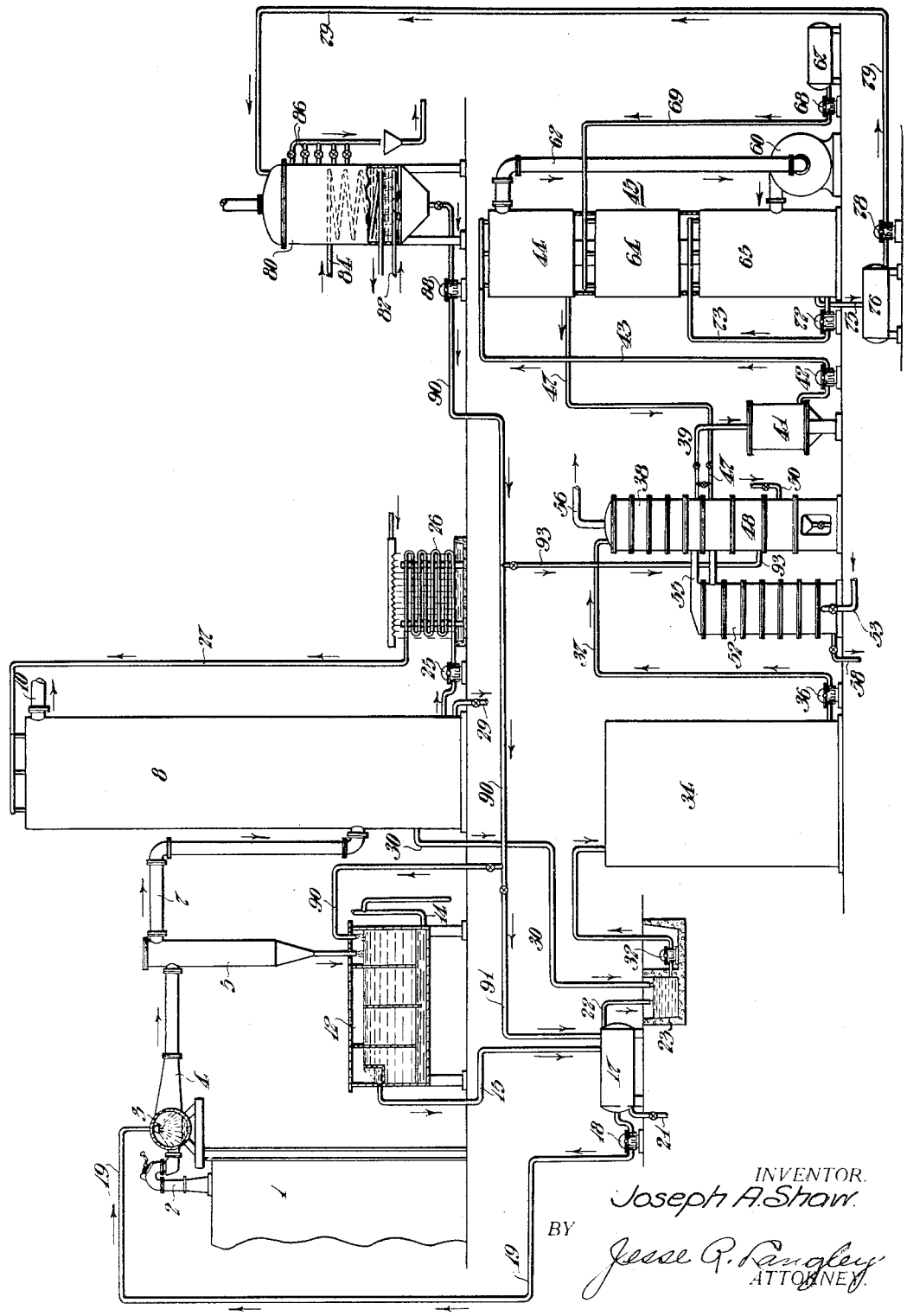
INVENTOR.
Joseph A. Shaw.
BY
Jesse G. Langley
ATTORNEY.

Patented Nov. 28, 1933

1,936,862

UNITED STATES PATENT OFFICE 1,936,862

TREATMENT OF GAS

Joseph A. Shaw, Pittsburgh, Pa., assignor to The Koppers Company of Delaware, a corporation of Delaware Application March 28, 1931. Serial No. 526,055

3 Claims. (Cl. 23—196)

My invention relates to the treatment of fuel gas, such as coal gas, coke-oven gas, or mixed gas, for the removal of constituents therefrom, and especially to the recovery of ammonia and compounds associated therewith from such gas.

In the preparation of fuel gases, such as coke oven gas and the like, for consumption, it is common practice to cool and partially condense the crude gas as produced to remove tar, ammonia, and other constituents. The gas is then further purified from tar and ammonia, if necessary; other constituents, such as light oil, hydrogen sulphide, and naphthalene are sometimes removed, and the purified gas is then distributed for consumption as fuel or for other utilization.

During the cooling and condensing stage or stages of purifying the gas, ammoniacal gas liquor is produced. This gas liquor is in contact with tar during and after its condensation from the gas, and before separation of the liquor from the tar is completed certain soluble constituents of the tar, especially tar acids such as phenol and its homologues, dissolve in the liquor.

The amount of tar acids so dissolved ordinarily represents a relatively small fraction of the amount originally contained in the gas, and the resulting concentration of tar acids in the liquor depends on the tar acid content of the tar with which the liquor is in contact, the temperature prevailing during the contact period, and other factors containing tar acid and ammonia.

The tar acid content of the gas liquor consequently varies over a fairly wide range, such as 0.5 to 5.0 grams per liter, determined as phenol, and is frequently about 3 grams per liter. Phenol is the predominating tar acid, and although cresols and other higher homologues are also present the tar acids are generally determined and referred to as phenol or phenols. Similarly the alkali metal salts of these tar acids are referred to as phenolate.

When the ammoniacal gas liquor is distilled in the usual manner for the recovery of ammonia, a major portion of the phenols remains in the still waste. Discharge of still waste contaminated with tar acids is prohibited in many localities, and consequently it has in many instances become necessary to dephenolize the gas liquor before its discharge as still waste, and preferably before liming the liquor to liberate fixed ammonia. Several processes whereby dephenolization is effected have been devised.

These dephenolization processes may be operated at various stages in the treatment of the gas liquor, and with various transfer agents. For example, the gas liquor may be washed with benzol, kerosene, or other immiscible solvent for tar acids before distillation, or the liquor may first be distilled to remove free ammonia and other volatile constituents, and then treated with steam or some other gas or vapor for the removal of tar acids.

Whether a liquid transfer agent, such as benzol, or a gaseous transfer agent, such as steam or gas, is used to remove tar acids from gas liquor in the stripping stage of the process, the thereby enriched transfer agent is then generally brought into contact with an alkaline absorbent for tar acids, such as a solution containing sodium hydroxide, in an absorbing stage.

In the absorbing stage, the alkaline absorbent removes phenols from the enriched transfer agent. The removed phenols react with the alkaline absorbent (e. g., caustic soda solution) to form phenolate, and the transfer agent may then be recirculated to remove tar acids from a further quantity of gas liquor.

When the caustic soda solution or other absorbent supplied to the absorbing stage of the dephenolizer has been converted to phenolate to the desired extent by absorption of tar acids removed from the gas with the gas liquor, the phenolate solution is withdrawn from the system. This solution is then "sprung" by treating it with an acid to liberate tar acids. Flue gas or other gases containing carbon dioxide are preferable for springing, but the phenolate may alternatively be partially sprung with other acids, as by contact with acid-washed light oil, for example, before completion of the springing with flue gas or the like.

After the springing is completed, the bulk of the tar acids liberated from the phenolate separates as a layer on top of the aqueous liquid, and is withdrawn for sale, storage, or other disposal. The aqueous liquid remaining after withdrawal of the phenols comprises essentially a solution of sodium carbonate and bicarbonate, but also may contain salts of other acidic constituents of the gas liquor and/or of the gas used for springing, such as sodium sulphide. The solution also usually contains a relatively small amount of dissolved phenols.

The extent to which carbonation is carried during springing may vary considerably; that is, the sodium hydroxide and phenolate may be just converted to carbonate, or substantially completely converted to bicarbonate, or at some intermediate point. For the sake of convenience, this liquid is referred to as "springing-tank carbonate" or simply "carbonate" solution.

The dissolved phenols may be removed from the carbonate solution by distillation, or by boiling with or without aeration, but in many instances such procedures are inconvenient or uneconomical. Because of the presence of these phenols, disposal of the solution by discharging it to streams and the like is impossible in many localities, as in the case of still waste. Furthermore, such discharge of the solution would be undesirable, as the available alkalinity of the carbonates would be wasted thereby.

In the practice of dephenolization, which is fundamentally a nuisance operation, it is essential that costs be kept as low as possible by obtaining the maximum benefit from the reagents consumed. Consequently it is desirable to dispose of the springing-tank carbonate in such manner that its alkalinity is utilized economically, and that its tar acid content does not cause phenolic pollution of water courses.

Among the most efficient methods devised in the past for accomplishing these results are employment of the carbonate solution in neutralizing acid-washed light oil, as described by I. H. Jones in a copending application Serial No. 531,979, filed April 22, 1931, and employment of the solution in liquid purification processes of purifying fuel gas from acidic constituents, such as $H_2S$. However, at many plants where dephenolization is practiced, or where it would be if there was available an economical means of disposing of the carbonate solution produced by springing sodium phenolate, neither light oil removal nor liquid purification of the gas from $H_2S$ and the like is practiced.

An object of the present invention is to provide a process wherein the alkalinity of carbonate solution produced in the recovery of tar acids from gas liquor is utilized economically.

A second object of my invention is to provide an improved process of recovering ammonia and constituents associated therewith from fuel gas.

Another object of my invention is to provide a process wherein the alkalinity of a caustic solution supplied for the absorption of tar acids originally contained in fuel gas is further utilized in the recovery of ammonia from the gas.

My invention has for further objects such other advantages and results as obtain in the process hereinafter described and claimed.

In the practice of my present invention, ammoniacal gas liquor and tar are removed from fuel gas by any suitable system of cooling and condensation. The tar is separated from the gas liquor, and part of the liquor is then preferably recirculated to cool a further quantity of gas in the collecting main and/or in the primary cooler or coolers. Excess liquor is discharged from the cooling system to an ammonia liquor storage tank.

Tar acids are removed from this liquor by contacting it with benzol, steam, or other suitable transfer agent, which in turn is contacted with an alkaline solution which removes tar acids from the transfer agent to form phenolate. As stated hereinabove, this dephenolization may be practiced before or after removal of free ammonia from the gas liquor, and the transfer agent, after purification from tar acids in the absorbing stage, is preferably recirculated to treat a further quantity of gas liquor.

After removal of tar acids and free ammonia, the liquor is mixed with lime or other suitable alkaline material which liberates fixed ammonia. The liquor is then further distilled to remove the liberated ammonia, and still waste substantially free from tar acid and ammonia is discharged to be disposed of as desired.

Phenolate solution is withdrawn from the dephenolizing system and sprung, preferably by passing through it a gas containing carbon dioxide. Phenols are thereby liberated, and the alkali phenolate and any unconverted caustic, such as sodium hydroxide, in the solution are carbonated. The phenols separate in a supernatant layer, which is withdrawn, leaving an aqueous solution of sodium carbonate and bicarbonate, which also usually contains other salts and a comparatively small amount of dissolved tar acids.

This carbonate solution I return to the gas cooling system, preferably at a point preceding the separation of aqueous condensate from tar, as in the flushing liquor system. For example, I may add the carbonate to the flushing liquor circulating tank, from which it is delivered to the collecting main and returns with condensate from the gas to a hot drain tank, in which aqueous liquor is separated from tar, or I may deliver the carbonate directly to the hot drain tank.

In either case, the phenols contained in the carbonate solution are divided between the tar and the aqueous liquid according to the partition coefficient obtaining at that time. The major portion of the phenols goes into the tar, and the tar acid content of the liquor is not materially increased. In fact, I have found in practice that there is no determinable difference in the average tar acid content of the gas liquor produced when my invention is practiced and the tar acid content of gas liquor produced when the springing-tank carbonate solution is not returned to the flushing liquor system.

By means of my invention a further advantage is realized, in that the carbonates react with fixed ammonia compounds in the liquor (or in the gas) to convert the ammonia to the free form, thus effecting a saving of lime in the distillation of the liquor to recover ammonia therefrom.

In a modification of the process, the springing-tank carbonate solution is added directly to the liquor in the liming chamber of the ammonia still, replacing lime. This modification is principally adapted to use when the presence of a small amount of tar acid compounds in the ammonia still waste is not objectionable, or when economic conditions are such that removal of dissolved phenols from the carbonate solution is justifiable, as when a ready market exists for all available phenols.

I now describe with reference to the accompanying drawing a preferred method of practicing my improved process of treating fuel gas for the recovery of ammonia and tar acids therefrom. In the drawing The single figure is a partially diagrammatic view of apparatus suitable for the practice of my present invention.

Fuel gas is produced in a coke oven or retort 1, which is usually one of a battery of similar retorts or ovens, and passes through an ascension pipe 2 into a hydraulic main or collecting main 3. In this main it is contacted with flushing liquor which cools the gas and condenses therefrom certain constituents such as tar and fixed ammonia. The gas and the flushing liquor and condensate pass from the main 3 through an offtake pipe 4 into a pitch trap 5.

Gas continues from the upper portion of the trap 5 through a pipe 7 into a primary cooler 8 in which the gas is further cooled and condensed, and the cooled gas leaves the primary cooler through a pipe 10 for further purification or other disposal.

The flushing liquor and condensate produced in the collecting main 3 pass from the bottom of pitch trap 5 into a hot drain tank 12. In this tank the aqueous liquor is separated from tar which may be discharged from the bottom of the tank through a pipe 14 for storage or other disposal.

The aqueous liquor containing free and fixed ammonia passes from the hot drain tank 12 through a pipe 15 into a flushing liquor circulating tank 17. From this tank at least a portion of the liquor is withdrawn by pump 18 and recirculated through a pipe 19 into the collecting main 3 to cool a further quantity of crude gas. Tar and other non-aqueous material may be withdrawn from the tank 17 through a pipe 21, and surplus liquor substantially equal in volume to the condensate produced in the flushing liquor system overflows from tank 17 through a pipe 22 to a tank or trench 23 or other suitable collecting means.

The primary cooler 8 may be of the direct or indirect type. In the present instance a cooler of the direct type is shown. The cooling liquor passes downwardly over contact material with which the interior of the cooler is packed in intimate contact with a countercurrent of gas. The gas is thereby cooled and condensate is formed which collects with the cooling water in a sump or well at the bottom of the cooler. From this sump cooling liquor is withdrawn by a pump 25 and recirculated through a cooler 26 and a pipe 27 into the primary cooler 8, where it cools a further quantity of gas.

Tar and the like may be withdrawn from the bottom of the cooler through a pipe 29 and excess cooling liquor overflows from the well through a pipe 30 into the collecting trench 23. Condensates produced in subsequent purification and treatment of the gas, as in the exhauster and/or tar extractor, may be returned to the hot drain tank 12, in which tar is separated from aqueous liquids as before. The aqueous liquids continue into the flushing liquor circulating tank 17 and from there to the trench 23.

From the trench 23 ammoniacal gas liquor is withdrawn by a pump 32 and delivered to an ammonia liquor storage tank 34. This liquor is now ready for treatment for recovery of ammonia and removal of tar acids.

In the present instance tar acids are removed by a dephenolizing process of the vapor recirculation type. Liquor is withdrawn from the storage tank 34 by a pump 36 and delivered through a pipe 37 to a free ammonia still 38. In this still free ammonia and other volatile constituents are removed from the liquor by a countercurrent flow of steam or other hot vapor, and liquor substantially free from free ammonia passes from the bottom of the free still through a pipe 39 into a surge tank or vent tank 41 which may be vented back to the still or to the dephenolizer, if desired.

The hot ammonia liquor is continuously withdrawn from the surge tank 41 by a pump 42 and delivered through a pipe 43 to an ammonia liquor section or stripping section 44 of a dephenolizer 45 of the vapor recirculation type. In this section 44 tar acids are removed from the ammonia liquor by a countercurrent flow of recirculated gas or vapor, which is thereby enriched.

Dephenolized liquor passes from the bottom of section 44 of the dephenolizer, and flows through a pipe 47 into a liming chamber 48, which may conveniently be situated beneath the free ammonia still 30. In this liming chamber 48 the liquor is mixed with milk of lime or other suitable alkaline material supplied through a pipe 50 which liberates fixed ammonia.

The liquor passes from the liming chamber into a fixed ammonia still 52 where it is distilled with steam supplied through a pipe 53. This steam removes ammonia remaining in the liquor, and vapors pass from the top of the still through a pipe 55 into the bottom of the free still 38. These hot vapors continue upwardly through the free still, from which they pass through a pipe 56 to be returned to the gas stream or otherwise disposed of. Still waste substantially free from ammonia and tar acid passes from the bottom of the fixed still 52 through a pipe 58 for any desired disposal.

Hot vapor or saturated gas is recirculated through the dephenolizer 45 by the blower 60 or other suitable means. This vapor is purified from tar acids in the absorbing section or sections of the dephenolizer, and then enters the stripping section 44 wherein it removes tar acids from ammonia liquor as described hereinabove. The enriched vapor passes from the top of the stripping section through a pipe 62 which returns it to the blower 60 for recirculation.

The absorbing stage of the dephenolizer may consist of any desired number of sections. In the present instance a dephenolizer is shown with two absorbing sections, namely, a fresh caustic section or shot section 64 and a recirculating section or lower section 65. If desired, the recirculating section may be omitted or, alternatively, there may be more than one recirculating section.

Fresh caustic soda solution or other suitable absorbent for phenols is withdrawn from a tank 67 by a pump 68 and delivered through a pipe 69, preferably intermittently, to sprays or other suitable distributing devices in the shot section 64 of the dephenolizer. This section is packed with steel turnings or other suitable contact material. The fresh caustic passes downwardly over this packing in intimate contact with the recirculated vapor, from which it substantially completes the removal of tar acids, and is thereby partially converted to phenolate.

The solution then continues downward into the recirculating section 65 over which phenolate or caustic-phenolate solution is recirculated by a pump 72. This pump withdraws the phenolate solution from a well in the bottom of section 65 and returns it through a pipe 73 and sprays or other suitable distributing devices to the top of the section. Beneath the sprays this recirculated solution is mixed with relatively fresh caustic solution from the shot section 64 and is thereby refreshed.

In a two-stage absorber of this type the major portion of the tar acids is generally removed from the vapor in the lower section 65. The degree of conversion to phenolate of the alkaline solution recirculated over this section may be very high, for example, 50% to 70% or more. Excess phenolate solution overflows from the sump in the bottom of section 65 through a pipe 75 to a phenolate storage tank 76. Phenolate solution is withdrawn from this tank 76 by a pump 78 and delivered through a pipe 79 to a springing tank 80.

Flue gas or other suitable gas containing carbon dioxide is admitted into the lower part of the spring tank 80 through a perforated pipe 82 or other suitable means. Phenolate in the tank is maintained at the desired temperature by a coil 84, which may be used either for heating or for cooling. It is usually preferable to keep the solution at a temperature slightly above atmospheric, such as 35° C., for example, during carbonation.

The gas passes upwardly through the tank in intimate contact with the phenolate, and the $CO_2$ reacts with the phenolate to liberate tar acids and to form carbonates. After the normal carbonate stage is reached, carbonation may be continued to any desired extent. For instance, it has been found that fairly good separation of the phenols is obtained when the free caustic and phenolate in the solution are just converted to normal carbonate, $Na_2CO_3$. The separation of phenols is faster and usually more complete, however, if carbonation is continued until at least a portion of the carbonate has been converted to bicarbonate.

When carbonation has been completed to the desired extent, the gas supply is discontinued and the solution is allowed to stand for a suitable period, which in most instances is a few hours. Tar acids separate as a supernatant layer on top of the carbonate solution and are withdrawn through offtake pipes 86 for storage or other disposal.

The carbonate solution is now ready for utilization. This solution is withdrawn from the springing tank 80 by a pump 88 or other suitable conveying means, and is preferably delivered through a pipe 90 to the hot drain tank 12 or from pipe 90 through pipe 91 into the flushing liquor circulating tank 17. As stated hereinabove, if it is economical to completely remove tar acids from the solution it may be passed from pipe 90 through pipe 93 into the liming chamber 48 of the ammonia still, where it replaces part of the milk of lime ordinarily supplied through pipe 50.

In the preferred procedure when the carbonate solution is returned to the hot drain tank 12 it is there mixed with the flushing liquor and condensate separated from the gas in the pitch tray 5. As the tar acid content of the aqueous liquor present depends chiefly on the partition coefficient obtaining under the prevailing conditions, the relatively small amount of phenols contained in the carbonate solution does not appreciably affect the amount of tar acid in the ammonia liquor.

Furthermore, the effect of the carbonate in converting the ammonia contained in fixed ammonium compounds to the free form produces the same results in this case as when the carbonate solution is added directly to the liming chamber. In face the effect produced is generally more beneficial when the carbonate is added to the flushing liquor system, as free ammonia is then produced in the solution while it is still in contact with the gas, and a portion of it may be returned to the gas for direct recovery in the form of sulphate.

While the present invention has special advantages when springing-tank carbonate solution is returned to the flushing liquor system as described hereinabove, other alkaline liquids, whether or not they contain tar acids, and also other liquids containing tar acids, may be similarly disposed of with a partial attainment of the advantageous results stated.

It will be obvious to those skilled in the art that various modifications can be made in the several parts of my apparatus and the several steps of my process without departing from the spirit of my invention, and it is my intention to cover in the claims such modifications as are included within the scope thereof.

I claim as my invention:

1. In a process of treating fuel gas by recirculating therethrough cooling liquor which removes tar and ammonia from the gas, the step comprising adding to said cooling liquor an alkaline liquid containing tar acid.

2. In a process of treating fuel gas by contacting said gas with cooling liquor which removes tar and ammonia therefrom, the step comprising adding to said cooling liquor an aqueous liquid containing tar acid.

3. In a process of treating fuel gas by contacting said gas with cooling liquor which removes tar and ammonia therefrom, the step comprising adding to said cooling liquor a solution obtained by carbonating sodium phenolate prepared from tar acid originally contained in said gas.

JOSEPH A. SHAW.